Patented Apr. 28, 1931

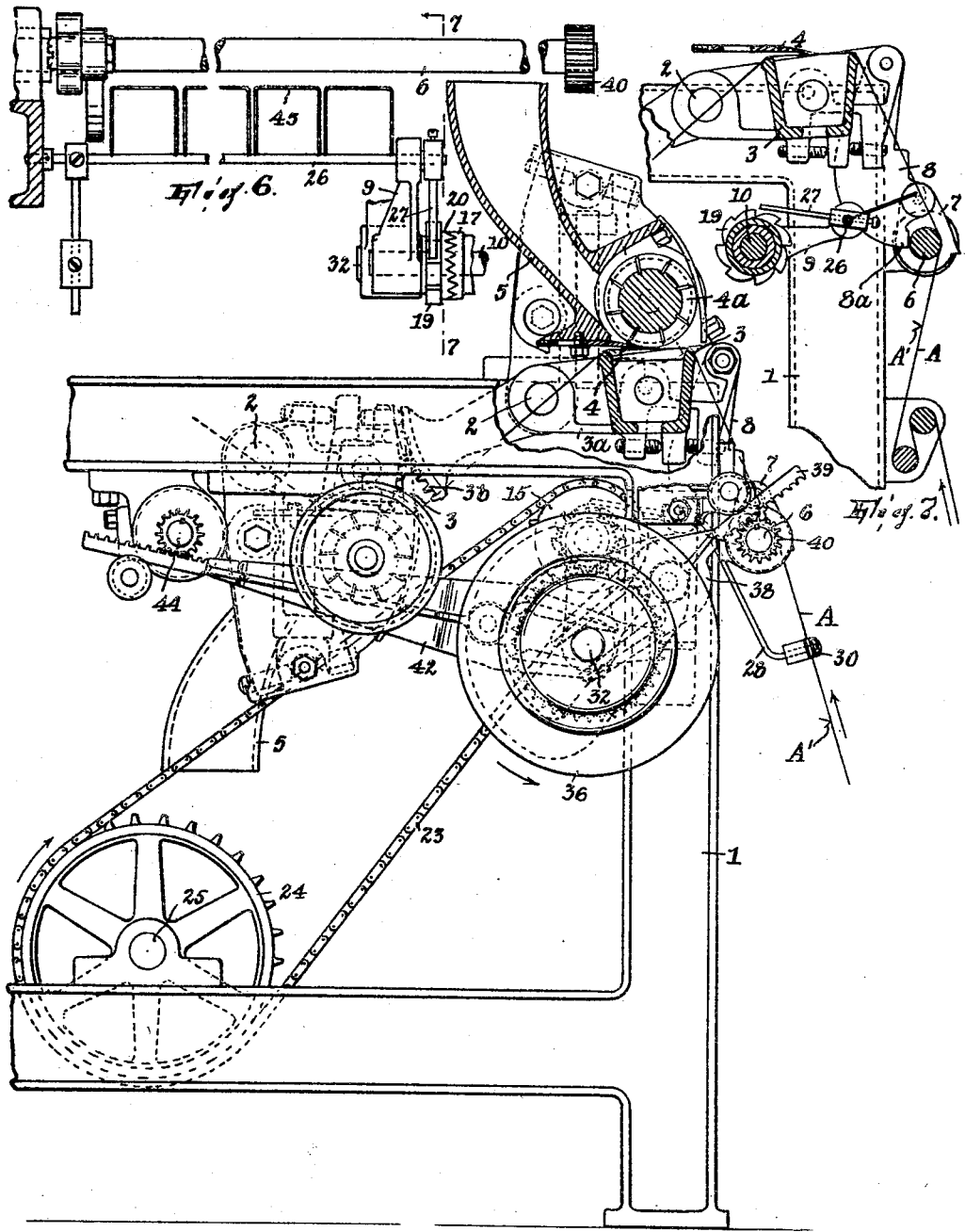

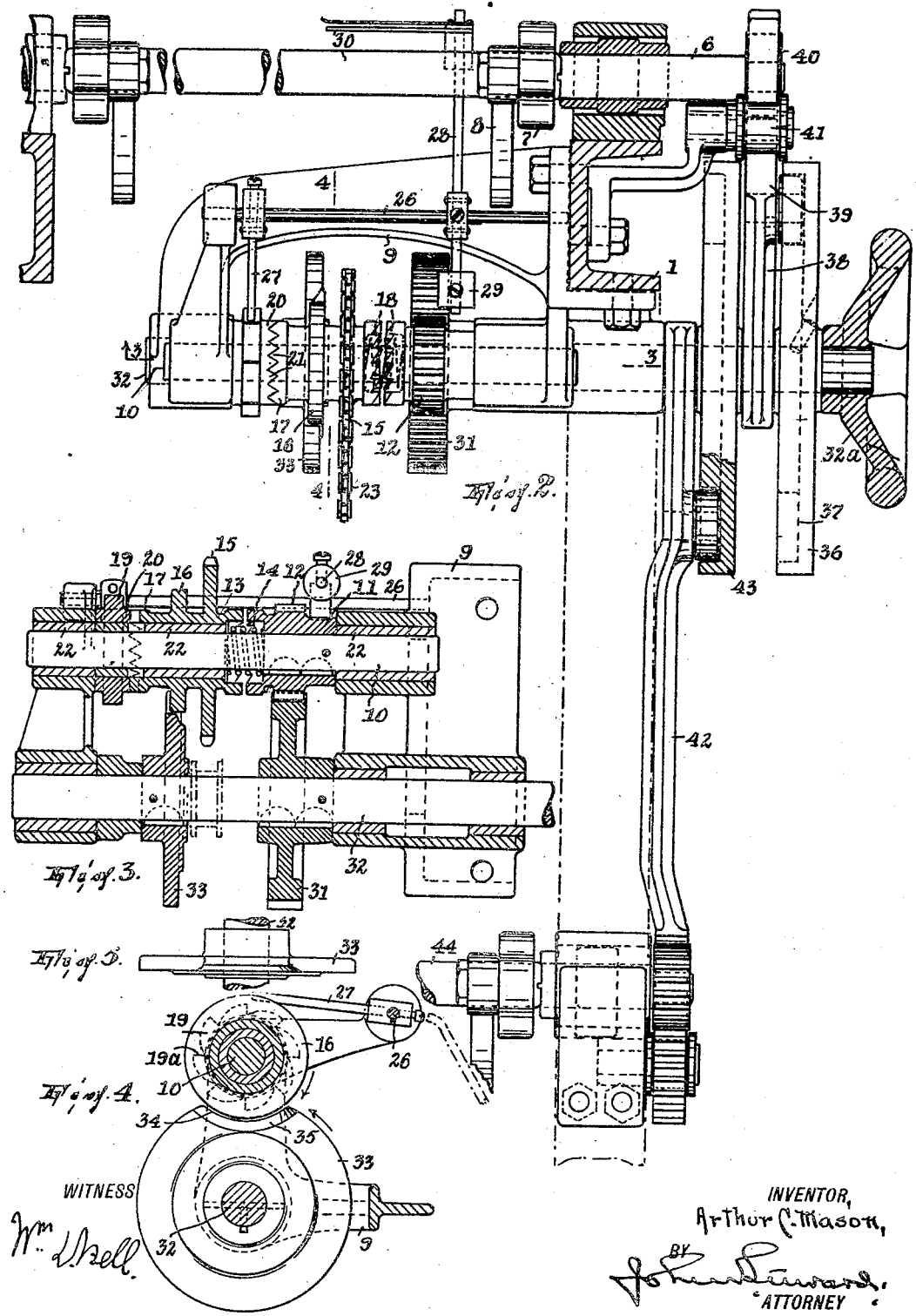

1,802,520

UNITED STATES PATENT OFFICE

ARTHUR C. MASON, OF HAWTHORNE, NEW JERSEY

FABRIC-SHEARING MACHINE

Application filed March 9, 1929. Serial No. 345,727.

This invention relates to machines for shearing the face of a moving cloth and of the class in which, given cloth shearing means and cloth guiding means, as a cloth-rest, one of them is movable to alter the space between and thus cause the fabric and shearing means to assume or cease to assume the proper relation to each other for the shearing. The principal object of the invention is to provide for effecting, in a more efficient way than heretofore, the movements of the movable one of said means, as automatically when a seam or other irregularity is to pass as well as manually when the fabric is to be entered. Other objects will be made apparent in the following description.

In the drawings,

Fig. 1 is a side elevation, partly in section, of a fabric shearing machine embodying the invention;

Fig. 2 is a fragmentary plan with the upper shear and its housing and corresponding cloth-rest removed and the frame appearing in section on line 2—2, Fig. 1, and certain parts broken away;

Fig. 3 shows certain mechanism in section on line 3—3, Fig. 2;

Fig. 4 is a section on line 4—4, Fig. 2;

Fig. 5 is a plan of the disk 33 shown in Fig. 4;

Fig. 6 is a fragmentary plan showing the form of cloth detecting means, different from that appearing in Fig. 1; and Fig. 7 is a section on line 7—7, Fig. 6.

The invention contemplates the provision of a shifter mechanism for one of the guiding and shearing instrumentalities in each cooperating pair (consisting of a cloth-rest and shearing means), a constantly moving actuating means, and means, controlled from the cloth, to intercouple said mechanism and means whereby to transmit motion to the former from the latter. In the example, where in accordance with my present object the instrumentality which is shifted undergoes back and forth shifting, said mechanism includes rotary means and means oscillated thereby and operatively connected with said instrumentality, and said rotary means is, under control of the cloth, intercoupled with the actuating means, for rotation therewith until the former has completed one oscillation and then released therefrom.

In the frame 1 on parallel horizontal shafts 2 are fulcrumed cloth-guiding instrumentalities consisting here of two cloth-rests 3 each having two supporting arms 3a arranged on a shaft 2 on which as a fulcrum it is movable up and down to and from a shearing instrumentality here comprising a fixed shear 4 and a suitably rotated shear 4a which is contained in a housing 5, so much being substantially the same as in my Patents Nos. 1,548,369 and 1,649,172. The cloth-rests, one facing up and the other down, are connected to move together as in the former of these patented constructions, but in this novel way: each cloth-rest has an arcuate series of gear teeth 3b and these teeth intermesh. It is best, seeing that they are to be automatically moved, that their movements require the minimum of effort, and this I attain by intergearing them in this way and also preferably by providing for each nearly to counterbalance the other, as will appear.

A lever structure consisting of a rock-shaft 6 having two arms 7 is fulcrumed in the frame to the right (Fig. 1) of the cloth-rests and said arms thereof have toggle-connection with the nearer cloth-rest by links 8; when the cloth-rests are moved so that the latter cloth-rest is raised they are held in their new or normal positions (the pivot between the links and arms having then passed a plane common to the shaft and pivot between the links and said cloth-rest) by contact of a stop 8a on one of the links with the rock-shaft 6, this being what I term the toggle-lock condition of the toggle-connection. The weight of the right-hand cloth-rest and the parts connecting the same with shaft 6 but somewhat more than equals that of the other cloth-rest and other parts between shafts 2, thus affording the near counter-balance mentioned.

Journaled in spaced bearings in a bracket 9 secured to and within the frame 1 is a horizontal shaft 10 having keyed thereto a driven clutch-member 11 formed with pinion teeth 12 and abutting one bearing. Adjoining and coactive with this clutch-member is another or driving clutch-member 13 which is normally urged therefrom by an interposed spring 14 and which is formed with a sprocket-wheel 15, a disk or flange 16 and a toothed cam 17. The teeth 18 of the two clutch-members are ratchet teeth (i. e., so that if either turned in one direction it would slip on the other but if turned in the other direction it would positively rotate the other). Between the other bearing and clutch-member 13 is a stop-wheel 19, formed like a ratchet-wheel with abutment faces at 19a, Fig. 4, and provided with a toothed cam 20 normally intermeshing with the toothed cam 17. Each tooth 21 of these two cams is formed with its sides sloped alike with respect to the axis of rotation (i. e., so that if either cam were turned in either direction it would slip on the other). The portions 21 of these members make them in effect cams, with a multiple of cam portions, and hence I term them cams. (22 simply denotes bushings forming the actual bearings for the shaft, clutch-members 11 and 13 and the stop-wheel 19). The driving clutch-member 13 is constantly driven by an endless chain 23 engaging sprocket-wheel 15 and a sprocket-wheel 24 on the main shaft 25, which may be driven by any suitable means (not shown).

A detector device, movable by impact of the seam therewith, comprises a spindle or fulcrum portion 26 journaled in the bracket 9, arm 27 movable into engagement with the peripheral face of the stop-wheel 19 so as to encounter one of its faces 19a and an arm 28 which may be counter-weighted at 29 and has a laterally projecting spring fork 30 the slit of which is adapted to receive the edge portion of the strip of fabric A and is of such limited width that on approach of a seam A' the detector device will be tilted from its normal position (Fig. 4) to a position where its arm 27 will encounter the stop-wheel and check its rotation, which normally ensues on account of the intermesh of the teeth thereof with clutch-member 13. When this occurs clutch-member 13 is displaced to the right by the camming action of teeth 21 as an incident of the rotation of said member and becomes clutched with clutch-member 11, which of course is thus rotated. The rotation of clutch-member 11, thus started, is made to continue for a period of time sufficient to accomplish the mentioned back-and-forth movements of the cloth-rests, and such rotation is transmitted to the cloth-rests to effect such movement thereof, as follows:

The teeth 12 of clutch-member 11 mesh with a gear 31 which is keyed on a shaft 32 below the shaft 10 and journaled in the bracket 9, and this shaft has keyed thereon a cam disk 33 which has a recess 34 at its periphery formed to an arc concentric with the disk 16 and its edge at the recess beveled, as at 35. Before clutch-member 13 is cammed to the right as just described its disk 16 occupies the recess 34 (see Fig. 4), the structure 31—32—33 being then of course stationary.

On such camming and consequent engagement of the clutch-members 13 and 11 and rotation of the latter clutch-member the said structure is started rotating and this brings the recess 34 out of register with the disk 16 of the clutch-member 13 (the bevel or knife-edge 35 in fact assisting the camming action at 21) so that the clutch-member 13 will be held by disk 31 engaged with clutch-member 11 until on a complete rotation of disk 13 the recess 34 will again coincide with disk 16. Thereupon spring 14 will be effective to return clutch-member 13 and disestablish the clutch connection with clutch-member 11 so that the structure 31—32—33 will come again to rest. The detector will fall back to its normal position (Fig. 4) upon disk 33 assuming the thrust of clutch-member 13.

On the near end of shaft 32 in Fig. 1 (see also Fig. 2) is a cam 36 having a cam-way 37. A slide 38 in the form of a fork, which receives the shaft 32 and thus in part guides the slide, has a rack 39 which engages a pinion 40 fixed on the shaft 6, the rack portion of the slide being guided between this pinion and a roller 41 suitably journaled on the frame. The one-cycle rotation of the structure 31—32—33 will through the cam 36 be imparted to the slide 38 and this will produce, as the result of the consequent oscillation of shaft 6, the desired back-and-forth movements of the cloth-rests.

The hereinbefore mentioned shifter mechanism comprises the following interconnected parts: 8—7—6—40—38—36—32—31—11—10; the constantly moving actuating means comprises the driving sprocket-wheel 24 and its chain 23; and the means, controlled from the cloth, to intercouple said mechanism with the actuating means is the clutch-member 13. The portion of said mechanism which has been hereinbefore referred to as the rotary means thereof comprises the parts 36—32—31—11—10; and the portion thereof hereinbefore referred to as the oscillatory means comprises the parts 8—7—6—40—38.

When the cloth is to be entered movement of the cloth-rests from the shearing means is manually effected by turning shaft 32 by means of its hand-wheel 32a.

If, as is sometimes the case, the machine comprises another shearing mechanism by which the cloth is sheared after undergoing shearing by the shearing mechanism already described the movements of the cloth-rests of this supplemental shearing mechanism may be controlled and effected by means similar to that already described, the parts of which are designated 42, 43 and 44 corresponding to the parts 38, 36 and 6.

A modified form of detector device is shown in Fig. 7 where instead of the fork 30 the spindle 26 has a row of flexible U-shaped wire feelers 45 projecting therefrom all in the same plane and all with their transverse portions alined so as to simultaneously bear against the moving fabric strip.

Having thus fully described my invention, what I claim is:

1. The combination of a frame, cloth-shearing and cloth-guiding instrumentalities, a shifter mechanism for one instrumentality including a revoluble driven clutch, a constantly rotated driving clutch, a cam for moving one clutch into engagement with the other whereby the driving clutch will cause movement of said mechanism, and means controlled by the cloth for positioning the cam to cause said clutch by its rotation to be cammed thereby into engagement with the coacting clutch.

2. The combination of a frame, cloth-shearing and cloth-guiding instrumentalities, a shifter mechanism for one instrumentality including a revoluble driven clutch, a constantly rotated driving clutch, an arrestable cam normally rotating with the driving clutch and when arrested being adapted to cam said driving clutch into clutching engagement with the other clutch and means, controlled from the cloth, to arrest the rotation of the cam.

3. The combination of a frame, cloth-shearing and cloth-guiding instrumentalities, a shifter mechanism for one instrumentality including a revoluble driven clutch, a normally retracted rotating driving clutch, and means, controlled from the cloth, to shift the driving clutch into engagement with the driven clutch whereby the former will cause movement of said shifter mechanism, said shifter mechanism having cam means thereupon engaging the clutch after its operation to retain the driving clutch in such engagement with the driven clutch.

4. The combination of a frame, cloth-shearing and cloth-guiding instrumentalities, a shifter mechanism for one instrumentality including a revoluble driven clutch, a normally retracted rotating driving clutch, and means, controlled from the cloth, to shift the driving clutch into engagement with the driven clutch whereby the former will cause movement of said shifter mechanism, said shifter mechanism having a part thereof thereupon rotating with the driven clutch and engaging the clutch after its operation to retain the driving clutch in such engagement during a predetermined extent of rotation of said part.

5. The combination of a frame, cloth-shearing and cloth-guiding instrumentalities, one being movable toward and from the other and normally urged in one direction, and pivotally interconnected links respectively pivoted to the former instrumentality and frame and movable past their dead-center position into abutting relation to each other and in their said relation holding said former instrumentality against movement in said direction.

6. The combination of a frame, cloth-shearing and cloth-guiding instrumentalities, one being movable toward and from the other and normally urged in one direction, pivotally interconnected links respectively pivoted to the former instrumentality and frame and movable past their dead-center position into abutting relation to each other and in their said relation holding said former instrumentality against movement in said direction, and means, controlled by the cloth, to disestablish the toggle-lock condition of said connection.

7. The combination of a frame, a pair of cloth-shearing instrumentalities, and a pair of systems pivotally movable around substantially horizontal axes and respectively including cloth-rests respectively cooperative with the shearing instrumentalities and each system approximately counter-balancing the other, said systems having intermeshing gears and being thereby pivotally movable in synchrony.

8. The combination of a frame, means to operate on the cloth including opposed instrumentalities between which the cloth travels, a shifter mechanism for one instrumentality including a driven clutch, a constantly moving driving clutch, a rotatable cam for moving one clutch into engagement with the other whereby the driving clutch will cause movement of said mechanism, and means controlled by the cloth for controlling the rotation of the cam and thereby causing the said clutch to be cammed into engagement with the coacting clutch.

In testimony whereof I affix my signature.

ARTHUR C. MASON.